Dec. 27, 1938.  G. C. SOUTHWORTH  2,141,281
WAVE TRANSMISSION
Filed July 22, 1936   3 Sheets-Sheet 1

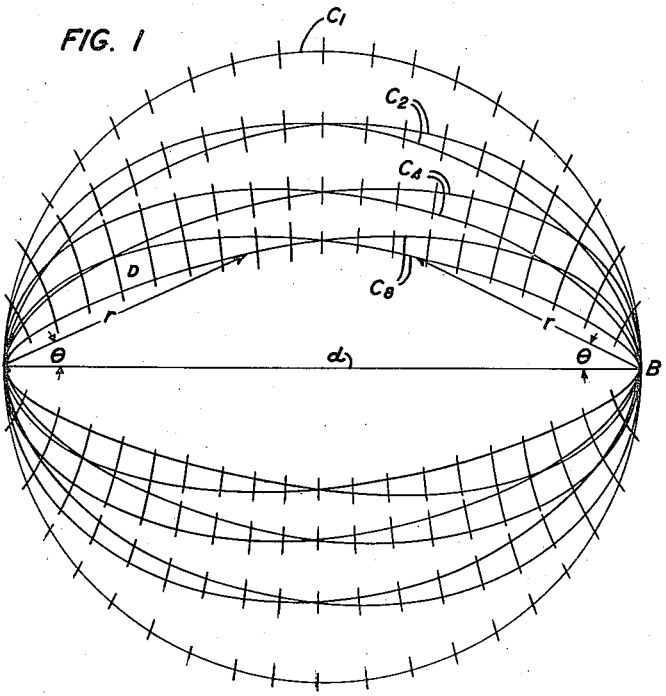

| CURVES | $r/d$ | $f(\theta)$ | $a$ |
|---|---|---|---|
| $C_1$ | $\cos\theta$ | $\cos\theta$ | 1 |
|  | $\cos\theta$ | $\cos^2\theta$ | 2 |
| $C_2$ | $\cos^2\theta$ | $\cos^2\theta$ | 1 |
|  | $\cos^2\theta$ | $\cos^4\theta$ | 2 |
| $C_4$ | $\cos^4\theta$ | $\cos^4\theta$ | 1 |
|  | $\cos^4\theta$ | $\cos^8\theta$ | 2 |
| $C_8$ | $\cos^8\theta$ | $\cos^8\theta$ | 1 |
|  | $\cos^8\theta$ | $\cos^{16}\theta$ | 2 |

INVENTOR
G. C. SOUTHWORTH
BY
ATTORNEY

Dec. 27, 1938.　　　G. C. SOUTHWORTH　　　2,141,281
WAVE TRANSMISSION
Filed July 22, 1936　　　3 Sheets-Sheet 2
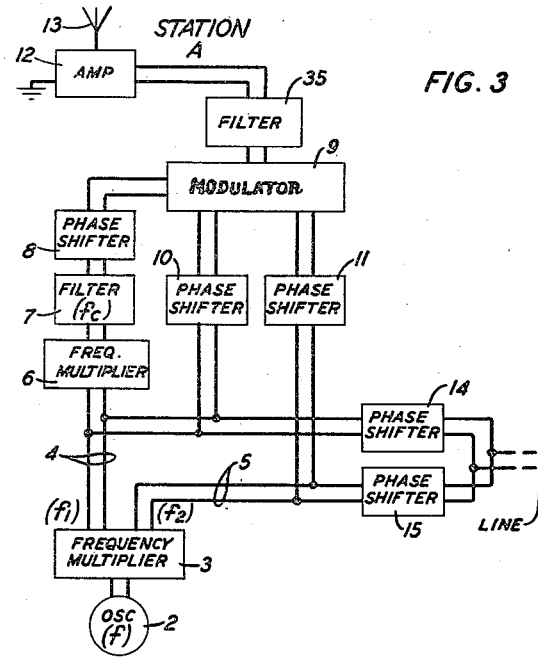
FIG. 3
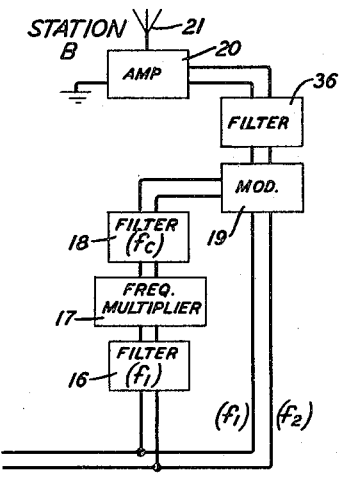
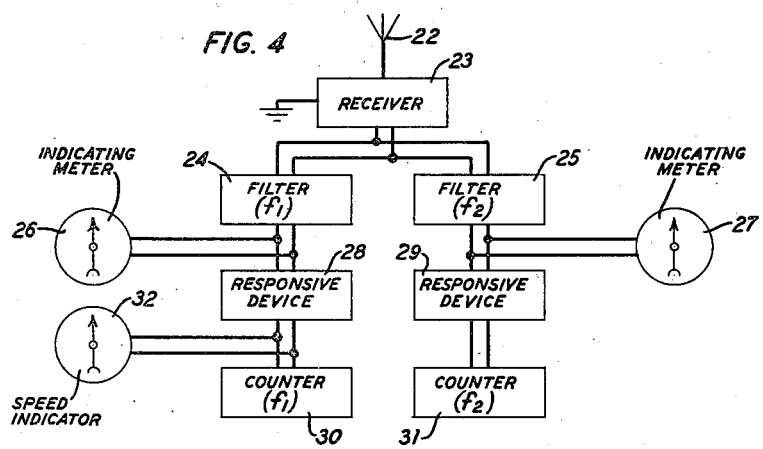
FIG. 4
INVENTOR
G. C. SOUTHWORTH
BY
ATTORNEY Dec. 27, 1938.   G. C. SOUTHWORTH   2,141,281
WAVE TRANSMISSION
Filed July 22, 1936   3 Sheets-Sheet 3
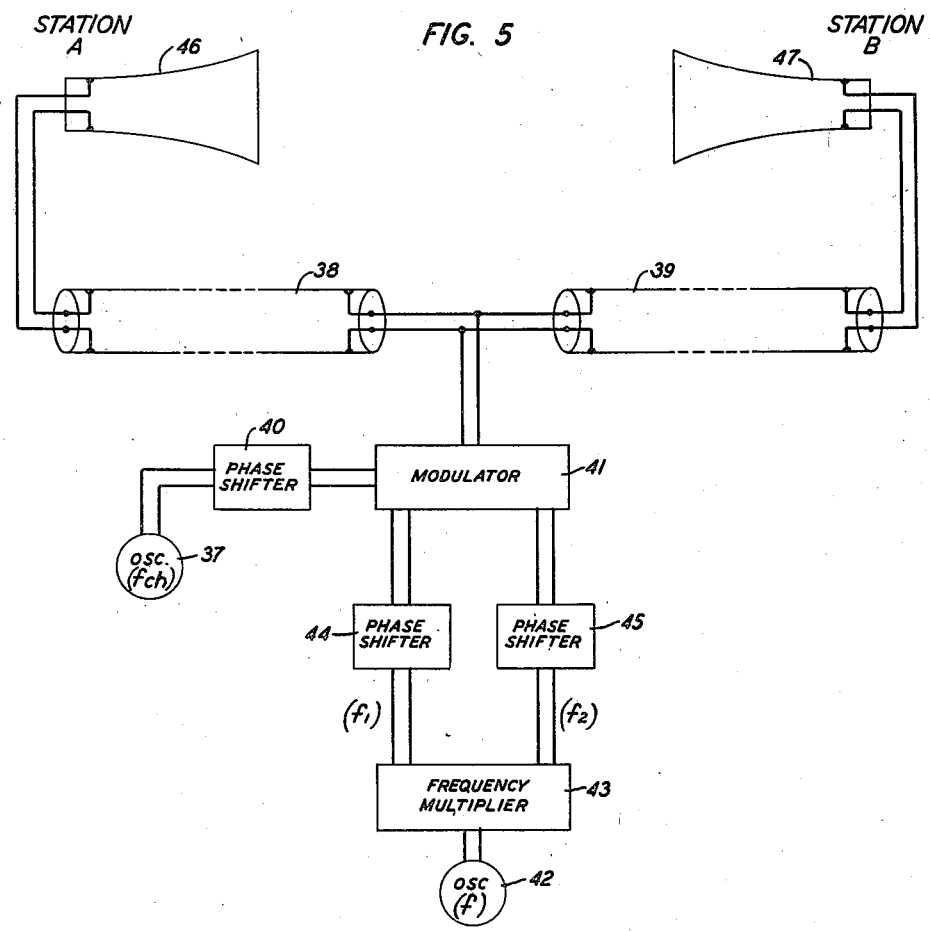
INVENTOR
G.C. SOUTHWORTH
BY
ATTORNEY Patented Dec. 27, 1938

2,141,281

UNITED STATES PATENT OFFICE 2,141,281

WAVE TRANSMISSION

George Clark Southworth, Red Bank, N. J., assignor to American Telephone and Telegraph Company, a corporation of New York Application July 22, 1936, Serial No. 91,971

6 Claims. (Cl. 250—11)

This invention relates to radio transmission and particularly to means for and to methods of setting up fields of energy in space for the guidance of moving craft.

The object of the invention is to facilitate the directional guidance of a moving craft along a desired route by establishing in space an energy field having fixed points of maximum and minimum intensity.

Numerous systems have been devised in the past for guiding moving craft, such as ships and airplanes, by means of radio waves. In one of these, which is commonly used in practice, a directional field is established in space by radiating from the transmitting beacon two distinctive trains of continuously moving waves usually of different frequencies. In other systems the phase relation between the transmitted waves is employed to determine the course. In others the moving craft is equipped with a receiver which detects the direction from which the wave is coming, and the craft is navigated toward the sending beacon from any direction without the use of any fixed course. Devices of this latter kind are known as homing direction finders.

According to the present invention advantages are secured over these prior arrangements by means of a direction finding system and method in which a zone of stationary or static waves is established in space by transmitting simultaneously from two distant stations moving waves of the same frequency and amplitude and directing the wave from each station toward the distant station. Since the two waves are moving through the same space but in opposite directions, they interfere, and, since they are of equal amplitudes, this interference is complete along the locus of equal field intensities for the two component waves. This locus is a narrow zone extending from one station to the other, and in this zone the two waves form a resultant standing wave having successive fixed points of zero intensity and successive fixed and equal points of maximum intensity. A pilot, guiding his airplane along this zone, observes the indication received as the craft passes over these maximum and minimum points, which are fixed relative to the earth, and knows he is on the course. If he deviates from the course, the craft leaves the zone of standing waves, and this will be evidenced by a disappearance of the periodically recurring points of zero or minimum field intensity and a change in the intensity of the maximum points. By varying the directive characteristics of the antennae at the opposed transmitting stations, the locus of points of uniform maximum and minimum amplitudes of the standing wave may be caused to define a variety of different paths between the two transmitting stations. In this way the course navigated by the craft flying from one station to the other may be varied to suit the requirements.

A feature of the invention is a method of establishing a field of standing waves, which may be utilized for guiding moving craft, in which waves of high frequency are generated and are guided through a dielectric medium to opposing transmitting stations where they are radiated in space simultaneously by directive transmitters.

These and other features of the invention will be understood more fully from the following specification and also from the appended claims.

The detailed description should be considered in connection with the accompanying drawings, in which:

Figure 1 is a diagram illustrating some of the courses that may be established for navigation between two points;

Fig. 2 is a table giving the functions of the angle for the different curves shown in the diagram of Fig. 1;

Fig. 3 is a diagram illustrating the equipment at the transmitting stations for establishing the courses shown in the diagram of Fig. 1; and Fig. 4 is a diagram of the receiving equipment located on the airplane or other moving object; and Fig. 5 is a diagram of a modified form of transmitting apparatus.

It is well known in the art of wave transmission that two waves having the same frequency and transmitted simultaneously from different transmitting points into the same space will interfere with each other and produce as a result of this interference what may be called a standing or static wave. A characteristic of this resultant standing wave is that its amplitudes, such as the maximum and minimum amplitudes, occur at fixed points in space along the direction of propagation of the two component moving waves. For example, the maximum amplitudes of the standing wave always occur at successive fixed points in space. They repeatedly undergo a change of sign but they do not change their position in space. The same is true of the minimum and of all other values of amplitude. The degree of interference between the two component waves, having the same frequency transmitted from different points, depends principally upon the phase relation and upon the relative values of the corresponding amplitudes. If the two waves are in phase and have equal corresponding amplitudes, the interference will be complete. This means, as will be shown later, that the standing wave resulting from the complete interference of the two component waves has a maximum amplitude twice the value of the maximum amplitude of the component waves and has a minimum amplitude equal to zero.

It is also well known that the intensity of a field established by the continuous propagation of waves from a transmitting station diminishes as the distance from the station increases. The law governing the decrease of intensity with distance depends upon a number of factors. For short distances, however, one of the most important factors is frequency, and it may be stated as approximately true that field intensity will vary inversely as the first power of the distance for long wave-lengths and inversely as the second power of the distance for very short wavelengths and that the variation will lie correspondingly between the first and second inverse powers for corresponding intermediate wavelengths. If we consider, therefore, two opposing transmitting stations each transmitting a nondirective wave of the same frequency, and each having equal corresponding amplitudes, it follows that the intensities of the two component fields are equal at points equally distant from the two transmitting stations. At these points the interference is complete. At all other points, however, which are nearer to one station than to the other, the amplitudes of the waves transmitted from the nearer station are greater than the amplitudes of the waves coming from the more distant station, and the interference is incomplete.

When these standing waves are received and detected on a moving craft and utilized for the purpose of determining the direction the craft is pursuing, the most satisfactory indications are obtained if the standing waves received are the result of complete interference of the component waves. In order to obtain this complete interference along the path which the moving craft desires to use as the course of navigation between the two transmitting stations, the method disclosed herein makes use of the directive characteristics of antenna arrays. If the antenna array at one of the transmitting stations has a given directive characteristic and the array is pointed for transmission toward the other station, there will be some line interconnecting the two stations along which the maximum values of field intensities will all be equal. This locus of equal intensity points may be considered as a curve whose departure from the straight line interconnecting the two stations will depend upon the directive characteristic of the antenna array.
The less directive the characteristic of the antenna array the wider the departure of the locus from the straight line interconnecting the stations, and the sharper the directive characteristic of the array the more closely the locus approaches the straight line. What has been said of the antenna array at one of the transmitting stations is also true of the transmitter at the other station.

The relations above explained may be seen more clearly by reference to Fig. 1 of the drawings. In this figure the two opposed transmitting stations A and B are equipped with directive antennae. Four sets of curves $C_1$, $C_2$, $C_4$, and $C_8$ are illustrated, each one representing the locus of equal intensity points for a particular directive characteristic for the opposing antennae. It is possible to construct an antenna which will have a desired directive characteristic, and, in obtaining the loci shown in Fig. 1 of the drawings, it is possible that the corresponding arrays are so constructed that their directivity is some function, such as the cosine of the angle between the base line $d$ and the vector $r$. For example, if the ratio $$\frac{r}{d}$$ is equal to the cosine of the angle $\theta$, the curve described by the vector $r$ when different values of $\theta$ are assumed is a circle $C_1$. The curve $C_1$, therefore, is the locus of equal intensity points in the field established by the antenna at A when the directive characteristic of the antenna is the cosine function of the angle $\theta$ and long waves are being transmitted. Since the locus of equal intensity points in the field established by the transmitter at B having the same directive characteristics is also a circle $C_1$, these two loci coincide as is indicated in the drawings. The locus $C_1$, therefore, may be used as a course for the navigation of a craft, and along this course, the interference between the waves from the two stations is complete, and sharply defined maximum and minimum (zero) amplitudes will be detected by the receiving equipment on an airplane flying along this course. The short lines intersecting the curve represent the regions of maximum strength in the standing wave field. The same locus $C_1$ is obtained when the directive characteristic of the antennae at A and B is represented by the function $\cos^2 \theta$ and short waves are being transmitted.

Assume next that the antenna arrays at the two stations have a directive characteristic which is represented by the function $\cos^2 \theta$ and that long waves are being radiated. In this instance the two curves $C_2$ are the loci, respectively, of the equal intensity points in the field established by the two transmitting stations. The ratio $$\frac{r}{d}$$ in this case is equal to $\cos^2 \theta$, and for this reason the curves $C_2$ are not circles. These curves, it will be noted, approach more closely to the line $d$. This is because of the greater directive characteristic of the antennae which is represented by the function $\cos^2 \theta$. Also it will be noted that the curves $C_2$ do not coincide. They do, however, lie fairly close to each other and thus define a narrow zone between the stations A and B in which the regions of maximum and zero intensities occur. The loci $C_2$ may also be obtained when short waves are being transmitted by choosing a directive characteristic for the antennae which is represented by $\cos^4 \theta$.

The other two sets of loci $C_4$ and $C_8$ illustrated in Fig. 1 are obtained in a similar manner. The curves $C_4$ are obtained when the directive characteristic of the antennae is represented by the function $\cos^4 \theta$ for long waves and by $\cos^8 \theta$ for short waves. The curves $C_8$ are obtained when the directive characteristic of the antennae is represented by $\cos^8 \theta$ for long waves and by $\cos^{16} \theta$ for short waves. These values are given in tabular form in Fig. 2. From these curves it will be seen that a course or zone of equal intensity points between the stations A and B may be chosen to suit the requirements by selecting the proper directivity of the transmitting antennae and proper wave-length.

The aircraft flying the course between the stations A and B is equipped with a suitable receiving set which will detect and indicate the successive maximum and zero amplitudes of field intensity as the craft flies along the course. Since these successive points of maxima and minima are stationary in space the rate at which they are approached will depend upon the speed of the craft. If the craft deviates either to the right or to the left of the course, it enters a zone of incomplete interference, the successive points of maximum and minimum intensity become less clearly defined and the pilot realizes that he has deviated from his course.

The standing wave field above discussed may be established by transmitting simple unmodulated sine waves of the proper frequency and amplitudes. However, better transmission may be obtained by radiating a carrier wave modulated with a signal wave of desired frequency.

The expressions for a standing wave obtained by the transmission of two amplitude modulated carrier waves will now be developed. Assume the two modulated waves are traveling in directions $+x$ and $-x$, respectively. Let the wave transmitted from station A be expressed by the equation $$E_1 = A\left[1 + m \sin p\left(t - \frac{x}{v}\right)\right] \cos \omega\left(t - \frac{x}{v}\right) \quad (1)$$

and let the wave transmitted from station B be expressed by equation $$E_2 = B\left[1 + n \sin p\left(t + \frac{x}{v} + \frac{\beta}{p}\right)\right] \cos \omega\left(t + \frac{x}{v} + \frac{\gamma}{\omega}\right) \quad (2)$$

wherein
A and B are the respective amplitudes of the unmodulated carriers.
$m$ and $n$ are respective degrees of modulation.
$\frac{p}{2\pi}$ = modulation frequency.
$\frac{\omega}{2\pi}$ = carrier frequency.
$v$ = velocity of propagation.
$t$ = time.
$\beta$ and $\gamma$ are phase angles that depend upon the phase and location of one transmitter relative to the other.

The resultant wave may be expressed $$E = E_1 + E_2 \quad (3)$$

For the case where $A = B$ and $m = n$ we have $$E = A\Big[\cos \omega\left(t - \frac{x}{v}\right) + \frac{m}{2} \sin (\omega + p)\left(t - \frac{x}{v}\right) - \frac{m}{2} \sin (\omega - p)\left(t - \frac{x}{v}\right) + \cos \omega\left(t + \frac{x}{v}\right) + \frac{\gamma}{\omega} + \frac{m}{2} \sin \left((\omega + p)\left(t + \frac{x}{v}\right) + \gamma + \beta\right) - \frac{m}{2} \sin \left((\omega - p)\left(t + \frac{x}{v}\right) + \gamma - \beta\right)\Big]$$

This reduces to $$E = A\Big[2 \cos \left(\frac{\omega x}{v} + \frac{\gamma}{2}\right) \cos \left(\omega t + \frac{\gamma}{2}\right) + m \cos \left((\omega + p)\frac{x}{v} + \frac{\gamma + \beta}{2}\right) \sin \left((\omega + p)t + \frac{\gamma + \beta}{2}\right) - m \cos \left((\omega - p)\frac{x}{v} + \frac{\gamma - \beta}{2}\right) \sin \left((\omega - p)t + \frac{\gamma - \beta}{2}\right)\Big] \quad (4)$$

Expression (4) will be recognized as representing three standing waves, one of which corresponds to the carrier and the other two of which correspond to the upper and lower side frequencies respectively.

Consider for the moment that part of expression (4) which represents the standing wave of carrier frequency $$\frac{\omega}{2\pi}$$

This part of the expression is $$2A \cos \left(\frac{\omega x}{v} + \frac{\gamma}{2}\right) \cos \left(\omega t + \frac{\gamma}{2}\right) \quad (4a)$$

In this expression the term $$\cos \left(\omega t + \frac{\gamma}{2}\right)$$

represents the time variation of the field with a frequency $$\frac{\omega}{2\pi}$$

while the term $$\cos \left(\frac{\omega x}{v} + \frac{\gamma}{2}\right)$$

indicates the waxing and waning at certain definite points along the path $x$. For instance at points where $$x + b = \frac{\lambda}{2}, \lambda, \frac{3\lambda}{2}, \text{etc.}$$

the peak amplitude is periodically equal to $2A$, whereas at points where $$x + b = \frac{\lambda}{4}, \frac{3\lambda}{4}, \frac{5\lambda}{4}, \text{etc.}$$

the amplitude is always zero. In these expressions $$b = \frac{\gamma \lambda}{4\pi}$$

and is constant for a given wave-length $\lambda$ and phase angle $\gamma$.

If therefore we let $x$ represent the distance from transmitting station A in the direction of propagation for the successive points in space where $$x + b = \frac{\lambda}{2}, \lambda, \frac{3\lambda}{2}, \text{etc.}$$

the first cosine argument in expression $$(4a) = \pi, 2\pi, 3\pi$$

etc., respectively. Substituting these values in the expression ($4a$) we find as above noted that the amplitude of the standing wave at the successive points is equal to $2A$ where A is the amplitude of the component wave transmitted from the station A. Similarly for the points along the direction of propagation where $$x+b=\frac{\lambda}{4}, \frac{3\lambda}{4}, \frac{5\lambda}{4}, \text{etc.}$$

respectively, the values of the argument are $$\frac{\pi}{2}, \frac{3\pi}{2}, \frac{5\pi}{2}, \text{etc.}$$

respectively. Substituting these values in expression (4a) we find as above explained that the amplitude of the standing wave at these successive points is equal to zero.

From the foregoing expressions it will be seen that the standing wave of carrier frequency has successive maximum amplitudes occurring at each half wave-length and likewise successive zero amplitudes occurring at each half wave-length.

It will now be demonstrated that when the signal modulated carrier waves are demodulated there is obtained a standing signal wave, the maximum amplitudes of which occur at successive points spaced at one-half the wave-length of the signal wave. When the wave expressed in Equation 4 is applied to a square-law detector, there results among other products of demodulation a term of modulation frequency:

$$E_m = A^2 m \sin p\left(t-\frac{x}{v}\right) + B^2 n \sin p\left(t+\frac{x}{v}\right) + \frac{\beta}{p} \quad (5)$$

which can after expansion be exhibited as $$E_m = \sqrt{(mA^2 + nB^2 \cos \beta)^2 + n^2 \beta^4 \sin^2 \beta} \cdot \cos\left(\frac{px}{v}+\xi\right) \sin pt +$$
$$\sqrt{(mA^2 - nB^2 \cos \beta)^2 + n^2 B^4 \sin^2 \beta} \cdot \cos\left(\frac{px}{v}+\pi\right) \cos pt \quad (6)$$

In Equation 6 if we let C stand for the first radical and H for the second radical we have $$E_m = C \cos\left(\frac{px}{v}+\xi\right) \sin pt +$$
$$H \cos\left(\frac{px}{v}+\pi\right) \cos pt \quad (7)$$

In Equation 7 if we let D represent the expression $$\cos\left(\frac{px}{v}+\xi\right)$$

and F represent the expression $$\cos\left(\frac{px}{v}+\pi\right)$$

we have
$$E_m = CD \sin pt + HF \cos pt \quad (8)$$

In the foregoing expressions $$\xi = \tan^{-1}\frac{nB^2 \sin \beta}{mA^2 + nB^2 \cos \beta}$$

and $$\pi = \tan^{-1}\frac{mA^2 - nB^2 \cos \beta}{nB^2 \sin \beta}$$

therefore we may write for expression (8)

$$E_m = \sqrt{C^2 D^2 + H^2 F^2} \sin\left(pt + \tan^{-1}\frac{EF}{CD}\right) \quad (9)$$

For the special case of $mA = mB$ we have, on substituting these relations in Equation 5

$$E_m = 2m\, A^2 \cos\left(\frac{px}{v}+\frac{\beta}{2}\right) \sin\left(pt+\frac{\beta}{2}\right) \quad (10)$$

The function expressed in Equation 10 has the characteristics of a standing wave at the modulation or signal frequency with separation between successive maxima corresponding to one-half the wave-length of the wave of signal frequency.

This separation is independent of the carrier frequency and is inversely proportional to the signal or modulation frequency.

By applying several modulating frequencies simultaneously at the transmitters, a decade system of markers can be established in space which can be detected by the receiver on the craft moving along the zone of the standing marking waves. For example, one modulating frequency can be selected to set up in space the maximum standing amplitudes at successive points with one-mile spacings. Another frequency may be selected to establish ten-mile points, etc. The following table gives the spacing between successive maxima in space for various frequencies together with the corresponding wave-lengths.

| Spacing kilometer | Frequency kilocycle | λ meters |
| --- | --- | --- |
| 0.1 | 1500 | 200 |
| 1 | 150 | 2,000 |
| 10 | 15 | 20,000 |
| 100 | 1.5 | 200,000 |

| Spacing miles | Frequency kilocycle | λ meters |
| --- | --- | --- |
| 0.1 | 932 | 322 |
| 1 | 93.2 | 3,220 |
| 10 | 9.32 | 32,200 |
| 100 | .93 | 322,000 |

By selecting the values of modulating frequencies, and by choosing the proper directive characteristics of the antennae at the transmitting stations A and B, it is possible to establish in space along any desired course between the transmitting stations a system of standing waves made up of one or more components, each of which is characterized by a series of equally spaced maximum and minimum amplitudes. As has already been explained, the receiver on the craft moving along this course detects and indicates the presence of these successive maximum and minimum points. The presence of these sharply defined maximum and minimum points serves to guide the craft along the desired course and the known spacing of these successive points serve as markers to indicate the distance traversed along the course.

In the early part of this specification a general explanation was given of the manner in which the courses may be established by choosing the proper directive characteristics of the antenna arrays. A derivation will now be given of a general formula for determining the loci of equal intensity points, which serve, as explained in connection with Fig. 1, to establish the courses. Consider that the two transmitting stations A and B of Fig. 1 are separated by a distance $d$. Let the horizontal or low-angle directive characteristic of the transmitters be denoted by $f(\theta)$, that is, a function of the angle between the line $d$ and the distance $r$ from the point A or B to the locus of equal intensity points. Also, let $g(r)$ denote a function which depends upon distance, frequency, ground conditions, and various phenomena associated with radio transmission. Then at a distance $r$ from one station the field strength due to that station will be given by $$E = Mf(\theta)g(r) \qquad (11)$$

where M is a constant.

Let it be required that $$E = Mf(\theta)g(r) = k \qquad (11a)$$

where $k$ is a constant representing the field strength and $r$ is the distance to the locus of field intensity $k$. Putting in the boundary conditions, we have $\theta=0$, in which case $d=r$. Then $M(1)g(d) = k$ since the cosine function of
$\theta$ is 1 for $\theta=0$ (11b)

Combining (11a) and (11b)

$$g(r) = \frac{g(d)}{f(\theta)} \qquad (12)$$

when $g(r)$ has the form $g(r) = r^{-a}$ $$r^{-a} = \frac{g(d)}{f(\theta)}$$

and, $$r^a = \frac{f(\theta)}{g(d)}$$

and, $$r = \frac{[f(\theta)]^{\frac{1}{a}}}{[g(d)]^{\frac{1}{a}}}$$

but since $d=r$ then $g(d) = d^{-a}$. Hence $$r = \frac{[f(\theta)]^{\frac{1}{a}}}{(d^{-a})^{\frac{1}{a}}} = \frac{[f(\theta)]^{\frac{1}{a}}}{d^{-1}} = d[f(\theta)]^{\frac{1}{a}}$$

Therefore, $$r = d[f(\theta)]^{\frac{1}{a}} \qquad (13)$$

Expression (13) is a general equation from which the locus of equal field intensity points may be obtained between the two transmitting stations for any given directive characteristic of the antennae and for any given frequency. The antenna array may be constructed such that its directive characteristic is represented by the cosine functions $f(\theta)$, such as those shown in the table of Fig. 2, and the value of $a$ may be calculated in accordance with the frequency of the wave transmitted.

A description will now be given of the transmitting and receiving equipment illustrated in Figs. 3 and 4 of the drawing. In Fig. 3 the two transmitting stations A and B are shown with their respective equipments and with a transmission line 1 interconnecting them. At station A the oscillation generator 2, which produces a wave of frequency $f$ is connected to a frequency multiplier 3. The multiplier 3 produces waves of frequency $f_1$, $f_2$ and delivers them respectively to the circuits 4 and 5. The wave $f_1$ is stepped up in frequency by multiplier 6 to produce relatively high frequency wave $f_c$ which is used as the carrier wave. The output wave $f_c$ from the multiplier 6 is separated from other frequencies by a filter 7, is passed through a phase shifter 8 to adjust its phase and is then delivered to the modulator 9. The low frequency or signal waves $f_1$ and $f_2$ are adjusted in phase by the respective phase shifters 10 and 11 and are then applied to the modulator 9. In the well known manner the modulator 9 modulates the carrier wave $f_c$ with both signal waves $f_1$ and $f_2$, and after passing a suitable filter 35, the products of modulation are amplified if necessary by the amplifier 12 and are then applied to the directive antenna array 13 for radiation.

The two signal waves $f_1$ and $f_2$ are also applied through phase shifters 14 and 15, respectively, to the transmission line 1. After having undergone the proper adjustment for phase in the shifters 14 and 15 these signal waves are transmitted over the physical line 1 to the distant transmitting station B. At the distant station a portion of the signal wave $f_1$ is selected by the filter 16, is stepped up by the frequency multiplier 17 to produce a carrier wave of the frequency $f_c$. This carrier wave is separated from other frequencies that may be present by the filter 18 and is then applied to the modulator 19. The two incoming low frequency signal waves $f_1$ and $f_2$ are also applied to the modulator 19 for the purpose of modulating the carrier wave $f_c$. The output circuit of the modulator 19 after passing a suitable filter 36, is connected through an amplifier 20 to the directive antenna array 21 which serves to radiate the modulated carrier wave.

The receiving equipment shown in Fig. 4 comprises a suitable receiving antenna 22 and a radio receiving set 23. The output circuit of the receiver 23 is connected to two filters 24 and 25. The filter 24 selects the signal wave $f_1$ resulting from the demodulation process and applies it to an indicating meter 26. The meter 26 gives a visual indication to the pilot as the craft passes over the points of maximum and minimum amplitude of the standing wave of signal frequency $f_1$. The filter 25 likewise selects the detected signal wave $f_2$ and applies it to the indicating meter 27. The meter 27 gives a visual indication of the successive points of maximum and minimum amplitude of the standing signal wave $f_2$. The output circuits of the filters 24 and 25 are also connected, respectively, to responsive devices 28 and 29. These devices may be arranged in any well known manner to respond to the successive impulses of current of the signal frequencies to cause the repeated operation of counting mechanisms 30 and 31. For this purpose the well known gas-filled tubes may be employed which respond to impulses of current. If desirable a speed indicating instrument 32 may be connected as shown to indicate the speed at which craft is moving by determining the rate at which the impulses of current are received from the filter circuit 24.

As has been explained, best results are obtained when the interference between the two oppositely directed waves is complete. To obtain complete interference, it is essential that the waves transmitted from the two stations have the same frequency, and it is also desirable that the proper phase relation be maintained. These desirable results are attained with a high degree of accuracy by the transmitting and radiating system disclosed in Fig. 5. In this system a carrier wave of very high frequency is generated at some suitable location intermediate the two transmitting stations A and B and is then transmitted to both stations simultaneously by means of wave guides of the type disclosed in my copending applications, Serial No. 701,711 filed December 9, 1933 and Serial No. 743,753 filed September 12, 1934. At the two stations the carrier waves are radiated directively in space to establish the standing wave field. Referring to Fig. 5, a carrier wave $f_{ch}$ having a frequency of the order of 2000 megacycles is generated by a suitable oscillator 37. The output waves from the oscillator 37 are then applied, either directly or through a modulator, to the wave guide tubes 38 and 39 extending respectively to the transmitting stations A and B. As illustrated, the oscillator 37 is connected through a phase shifter 40 to the modulator 41, which serves to modulate the high frequency carrier wave with two waves $f_1$ and $f_2$ of signal frequency. The waves $f_1$ and $f_2$ are produced by applying the output wave $f$ from the oscillator 42 to the frequency multiplier 43. The phase shifters 44 and 45 serve respectively to control the phases of signal waves $f_1$ and $f_2$ before applying them to modulator 41.

The output waves from the modulator 41 are guided through the tubes 38 and 39 to the transmitting stations A and B where they are applied to the respective directive transmitters 46 and 47. The transmitters 46 and 47 establish in space a field of standing waves as described in connection with Fig. 3 of the drawings. The directivity of the transmitters 46 and 47 may be chosen to obtain zones of equal field intensity for the standing waves in the manner hereinbefore explained. Also as above explained the airplane is equipped with a suitable receiving set which is capable of detecting the presence of the standing waves. In case the high frequency wave $f_{ch}$ is transmitted without modulation, an airplane flying at the rate of 100 miles per hour would pass over approximately 300 cycles of the standing wave, the effect of which would be a tone in the receiver corresponding to a wave of 300 cycles. This tone would inform the pilot when he was flying along the course of the standing waves. By modulating the high frequency wave $f_{ch}$ with the signal waves $f_1$ and $f_2$ of proper frequencies, and by equipping the airplane with a receiver for demodulating the modulated carrier wave, signals of maximum and minimum intensity may be received at equal spaced distances along the course of flight.

While the high frequency generating oscillator 37 is located at some point intermediate to transmitting stations A and B, it should be understood that the invention is not so limited. For example, the oscillator may be located at one of the stations, A or B, and the generated wave may be transmitted by a dielectric guide to the other station for radiation thereat simultaneous with the radiation at the first station.

What is claimed is:

1. The method of guiding a moving craft which comprises transmitting energies of the same frequency and intensity from two spaced antennae having similar directive characteristics pointed toward each other whereby a zone extending from one antenna to the other is established in which the maximum amplitudes of the waves from both antennae are equal and in which said waves combine to form a standing wave, and periodically receiving at the moving craft the same amount of energy from said standing wave, substantially.

2. The method of guiding moving craft which comprises transmitting waves of the same frequency and intensity from two spaced antennae having similar directive characteristics pointed toward each other whereby a standing wave field is established in which the locus of equal maximum amplitude points of the standing wave field is a line extending from one antenna to the other, controlling the directive characteristics of said antennae to control the position of said locus, ascertaining at the craft the position of said locus and aligning the direction of movement of said craft with said locus.

3. The method of guiding moving craft which comprises transmitting waves of the same frequency and intensity from two spaced antennae having similar directive characteristics pointed toward each other, whereby a standing wave field is established in which the locus of a succession of fixed points at each of which said field has zero amplitude is a line extending from one antenna to the other, controlling the directive characteristics of said antennae to control the position of said locus, ascertaining at the craft the position of said locus and aligning the direction of movement of said craft with said locus.

4. The method of guiding a moving craft which comprises transmitting from two distant antennae having similar directive characteristics pointed toward each other, two carrier waves modulated with two signal waves of the same frequency and amplitude to establish in space a zone extending from one station to the other in which the amplitudes of the signal waves when detected at successive fixed points are equal, demodulating said modulated waves to obtain said signal waves, and steering said craft so as to receive thereat, alternately and periodically, signal waves of the same maximum intensity and the same minimum intensity, substantially.

5. A method of establishing a radio course between two points, utilizing antennae at said points having similar directive characteristics, which comprises supplying energies of the same frequency and same intensity to said antennae and aligning the equal intensity portions of the directive characteristics of said antennae with the same path connecting said stations, whereby a standing wave field having maximum points of equal intensity and minimum points of zero intensity is produced on said path.

6. A method of radio navigation which comprises establishing a radio guide or course in accordance with claim 5, and steering a mobile craft so as to receive thereat successively energy from the successive maximum and minimum points of said standing wave field.

GEORGE CLARK SOUTHWORTH.